(12) United States Patent
Klug et al.

(10) Patent No.: US 6,512,609 B1
(45) Date of Patent: Jan. 28, 2003

(54) SYSTEM AND METHOD FOR CORRECTING PROJECTION DISTORTIONS IN A HOLOGRAM PRODUCING SYSTEM

(75) Inventors: Michael A. Klug, Austin, TX (US); Qiang Huang, Austin, TX (US)

(73) Assignee: Zebra Imaging, Inc., Pflugerville, TX (US)

(*) Notice: Subject to any disclaimer, the term of this patent is extended or adjusted under 35 U.S.C. 154(b) by 0 days.

(21) Appl. No.: 09/636,105

(22) Filed: Aug. 10, 2000

Related U.S. Application Data

(60) Provisional application No. 60/148,136, filed on Aug. 10, 1999.

(51) Int. Cl.[7] .............................. G03H 1/26; G02B 5/32; G02B 27/14; G03B 21/00
(52) U.S. Cl. .............................. 359/23; 359/22; 359/15; 359/35; 359/630; 359/634; 353/30; 353/31
(58) Field of Search .................................. 359/1, 15, 22, 359/23, 24, 30, 35, 634, 630, 618; 353/30, 31

(56) References Cited

U.S. PATENT DOCUMENTS

| | | | | |
|---|---|---|---|---|
| 5,305,146 A | * | 4/1994 | Nakagaki et al. | 359/634 |
| 5,793,503 A | * | 8/1998 | Haines et al. | 359/23 |
| 5,946,114 A | * | 8/1999 | Loiseaux et al. | 359/15 |
| 5,949,559 A | * | 9/1999 | Kihara et al. | 359/23 |

* cited by examiner

*Primary Examiner*—Audrey Chang
(74) *Attorney, Agent, or Firm*—Campbell Stephenson Ascolese LLP; Marc R. Ascolese

(57) ABSTRACT

A system and method are disclosed to replace complex fast cylindrical lens (FCL) systems used for producing one-step horizontal parallax only holographic sterograms. A substantially monochromatic fast cylindrical lens is combined with chromatic corrector optics and image scaling performed in conjunction with spatial light modulators (SLMs) in order to avoid the use of an anchromatic FCL.

13 Claims, 5 Drawing Sheets

SYSTEM AND METHOD FOR CORRECTING PROJECTION DISTORTIONS IN A HOLOGRAM PRODUCING SYSTEM

This application claims the benefit, under 35 U.S.C. §119 (e), of U. S. Provisional Application No. 60/148,136 filed Aug. 10, 1999, entitled "Optical System for Producing One-Step Holographic Stereogram System", and naming inventors Michael A. Klug and Qiang Huang. The above-referenced provisional application is hereby incorporated by reference herein in its entirety.

FIELD OF THE INVENTION

The present invention relates in general to the field of hologram production and display and, more particularly, to a system and method for providing multiple and full color holographic stereograms.

BACKGROUND OF THE INVENTION

One-step hologram (including holographic stereogram) production technology has been used to satisfactorily record holograms without the traditional step of creating preliminary holograms. Both computer image holograms and non-computer image holograms may be produced by such one-step technology. In some one-step systems, computer processed images of objects or computer models of objects allow the respective system to build a hologram from a number of contiguous, small, elemental pieces known as elemental holograms or hogels. To record each hogel on holographic recording material, an object beam is conditioned through the rendered image and interfered with by a reference beam. Examples of techniques for one-step hologram production can be found in the U.S. patent application entitled "Method and Apparatus for Recording One-Step, Full-Color, Full-Parallax, Holographic Stereograms," Ser. No. 09/098,581, naming Michael A. Klug, Mark E. Holzbach, and Alejandro J. Ferdman as inventors, and filed on Jun. 17, 1998, which is hereby incorporated by reference herein in its entirety.

Many holographic stereogram recording systems, and horizontal parallax-only one-step holographic stereogram recording systems in particular, generally require highly specialized optics in order to condition and modulate laser light to encode image information. In a standard optical system of this type, laser light directed through or reflected from a spatial light modulator (SLM) usually proceeds through a number of cylindrical lenses that serve to produce a magnified, anamorphic image of the SLM at the front focal plane of an output cylindrical lens, typically a fast cylindrical lens (FCL) which is often defined as a cylindrical lens with an effective f number less than 1.0. Examples of techniques for horizontal parallax-only one-step holographic stereogram production can be found in the U.S. patent application entitled "System and Method for Producing and Displaying a One-Step, Edge-Lit Hologram," Ser. No. 09/504,730, naming Michael A. Klug and Mark E. Holzbach as inventors, and filed on Feb. 16, 2000, which is hereby incorporated by reference herein in its entirety.

Anamorphic image relay is often required to match the aspect ratio of the fast cylindrical lens to that of the spatial light modulator. The high cost, and relatively large degree of aberration characteristic of large cylindrical lenses, suggests adapting the anamorphic projection system for use with a fast cylindrical lens where one dimension (e.g., the "power" dimension) is reduced in size. Also, the lenses needed for anamorphic relay are by necessity cylindrical themselves. Such lenses are difficult to find "off the shelf" and are therefore expensive and time-consuming to custom produce. Moreover, optical systems incorporating nested cylindrical lenses for anamorphic image magnification and relay often introduce additional distortion into the image (e.g, coma), since light rays must pass obliquely through orthogonally-active lenses.

Although advantageous from a cost and simplicity standpoint, current FCLs are generally optimized for only one wavelength and thus exhibit significant chromatic aberration. This typically results in a wavelength-dependent axial shift of the focus and a variation in convergence angle to that focus, both of which are detrimental to the process of producing high-quality multiple or full color holograms.

Another issue associated with the image projection optics arises when a three-color image relay is considered. Optical design for fast cylindrical lenses, or any lens, for that matter, is greatly simplified if proper performance is only desired for a single wavelength. This is due to the inherent chromatic dispersion of lens materials (e.g., glass, borosilicates, and fused silica), which causes simple "singlet" lenses to focus light of different wavelengths in different planes. This phenomena is called chromatic aberration. It is possible to design optical systems that minimize chromatic aberration; however, these systems are typically more complex than their single wavelength counterparts, usually requiring a number of different lenses/materials sometimes cemented in pairs (doublets), or even threes (triplets). Such systems are also less efficient than their monochromatic counterparts, since the necessary inclusion of additional materials and elements produces more absorption and spurious interface reflection of the light passing through that system.

Accordingly, it is desirable to have a hologram producing system where size, cost, and complexity are reduced, while maintaining an efficient system that introduces few additional sources of distortion, and produces high quality holograms.

SUMMARY OF THE INVENTION

In accordance with teachings of the present invention, a system and method are disclosed to provide manufacturable, affordable, robust one-step horizontal parallax only holographic stereogram systems for commercial markets. The present invention allows a substantially monochromatic fast cylindrical lens (FCL) to produce substantially the same results as an achromatic FCL.

An objective of the design of such a system is simplicity, efficiency, and cost minimization. Aside from the lasers, some of the most expensive components of such systems are the associated fast cylindrical lens (FCL). By combining simple, inexpensive chromatic corrector optics with image scaling in accordance with teachings of the present invention, a relatively inexpensive FCL can be used, thus avoiding the added cost and complexity of an achromatic FCL. Additionally, incorporation of chromatic corrector optics in accordance with teachings of the present invention, allows for a more efficient system, since it adds fewer optical material volumes and material-to-air surfaces through which light must pass. The present invention can enable use of lower power lasers which will generally reduce the price and increase the robustness of the resulting system.

Accordingly, one aspect of the present invention provides a system for relaying and conditioning color images for use in producing a holographic stereogram. The system includes at least two spatial light modulators and a color combining element for receiving a respective color image from each spatial light modulator. Respective chromatic corrector optics are disposed between each spatial light modulator and the color combining element. A first cylindrical lens is located to receive the color images from the first and second spherical lenses and to project the color images to produce the holographic stereogram.

Another aspect of the present invention provides a system comprising a first projection system, a projection-distortion corrector mechanism, and a second projection system. The first projection system includes optics substantially optimized to project an image generated via a first-frequency light source onto a recording plane. The second projection system projects an image generated via a second-frequency light source onto the recording plane. The second projection system has a substantial duplication of at least a part of the optics substantially optimized to project the image generated via the first-frequency light source onto the recording plane, and the substantial duplication is operably coupled with the projection-distortion corrector mechanism.

In another aspect of the present invention, a method includes compensating for distortion of an image projected onto a recording plane in a projection system. The image is generated via a second-frequency light source and the projection system has optics substantially optimized for a first-frequency light source. The compensating is achieved by operably coupling a projection-distortion correction mechanism with the projection system.

BRIEF DESCRIPTION OF THE DRAWINGS

A more complete understanding of the present invention and advantages thereof may be acquired by referring to the following description and the accompanying drawings, in which like reference numbers indicate like features.

DETAILED DESCRIPTION

The following sets forth a detailed description of at least the best contemplated mode for carrying out the one or more devices and/or processes described herein. The description is intended to be illustrative and should not be taken to be limiting.

Various features of the present invention will be described with respect to a three color system of red, green and blue. These colors may be combined together to produce a "full color image." However, a wide variety of other colors may be satisfactorily used with the present invention. For example, a system incorporating teachings of the present invention may be used to produce a first holographic stereogram of a first color and a second holographic stereogram of a second color. For still other applications, the present invention may be used to produce holographic stereograms in infrared and/or ultraviolet wavelengths. Finally, a system incorporating teachings of the present invention may be used to project holographic stereograms using registered and/or unregistered colors.

Figure 1:
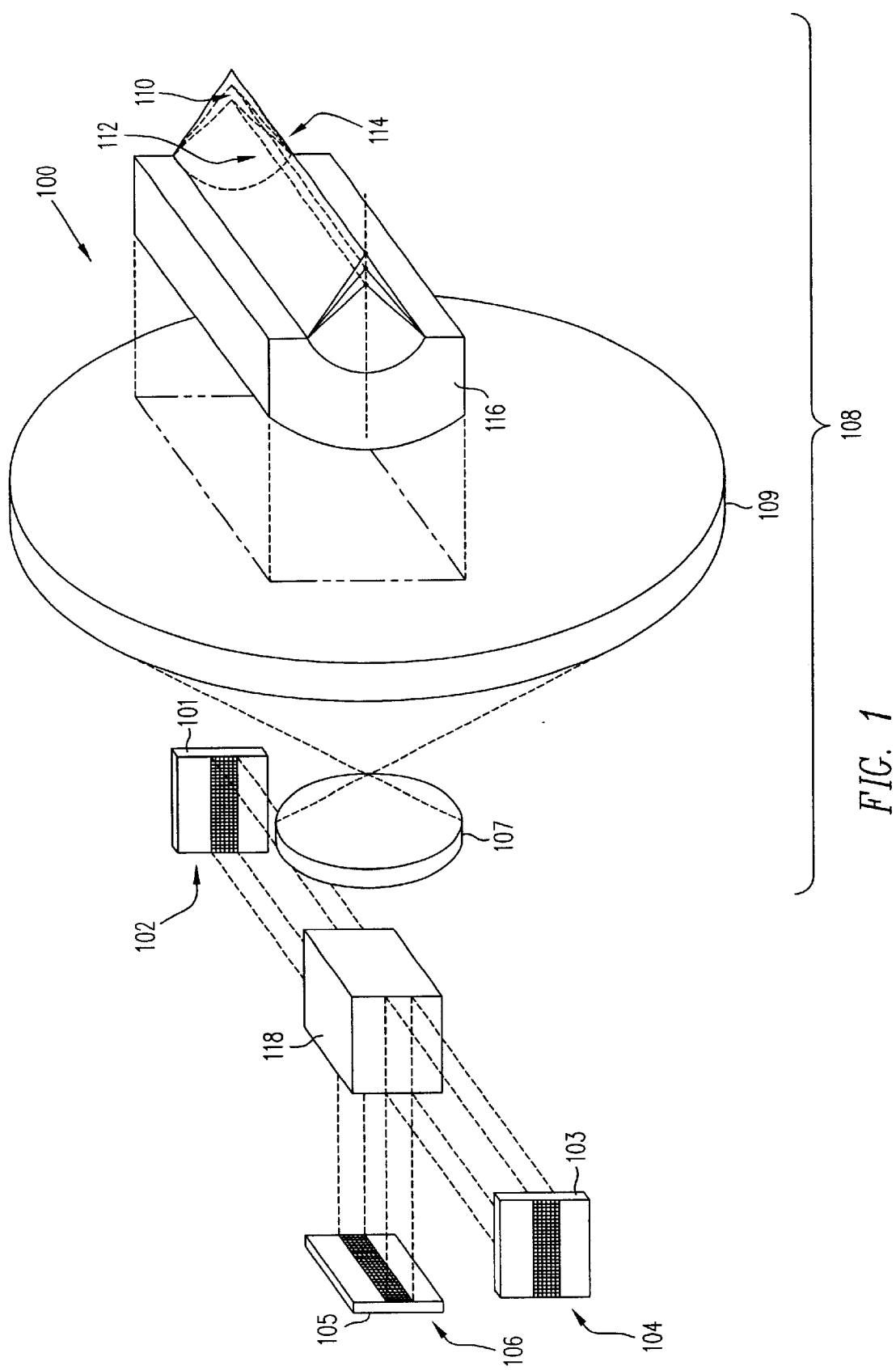
FIG. 1 illustrates a projection system where spatial light modulators (SLMs) are used to allow the replacement of cylindrical optics with spherical optics.

FIG. 1 illustrates a projection system where high resolution spatial light modulators (SLMs), in this case liquid crystal displays (LCDs), are used to allow the replacement of "traditional" cylindrical optics with spherical optics. Due to the advent of efficient, compact, high resolution spatial light modulators, it has become feasible to utilize spherical projection of highly elongated images made by shrinking the image in one dimension, while retaining the image's size in the other. For example, SLMs with resolutions as high as 1280×1024 pixels are currently commercially available in the form LCD panels. Since a 5:1 image aspect ratio requires an image pixel size of 1280 high×256 wide, current SLMs can be programmed (by associated computer systems) to produce images tailored for aspect ratios typical of the cylindrical output lenses used in holographic production systems. Such resolution provides adequate perspective sampling for stereogram systems currently being developed. Thus, making use of a high resolution SLM enables replacement of complex cylindrical optics used for anamorphic image relay with a simplified spherical image relay system, while still maintaining the necessary image aspect ratio to present to the fast cylindrical lens.

A partially-schematic diagram of portion 100 of a 3-color-combining system is shown in FIG. 1. Depicted are red, blue, and green images 102, 104, and 106 which are produced when red, blue, and green lasers (not shown) illuminate (e.g., pass through or reflect off) SLMs 101, 103, and 105, respectively. As shown, red, blue, and green images 102, 104, and 106 are formed by fewer than the maximum number of available pixels in one direction so that the aspect ratio of the images can be matched to fast cylindrical lens 116. Moreover, the aforementioned anamorphic image relay optics have been replaced by spherical lenses 107 and 109.

In addition to resolution improvements, many SLM imaging systems in production today make use of three separate SLMs, one for each primary color, that are optically combined (usually with dichroic beam splitter optics or prisms) to form a single full-color image. Light from each of three lasers can be directed on the SLM bearing the color separation information corresponding to the respective laser wavelength. The three laser beams can be independently directed and optically shaped, if necessary.

The optical system needed for relay and magnification of an already properly-sized image is fairly simple, consisting of two spherical lenses whose focal length ratio is equivalent to the desired magnification value. Such lenses are readily available or can be manufactured at minimal cost. If optimal performance is desired in multiple wavelengths, as in the case of three color imagery, achromatic lens combinations may be substituted, again at relatively low cost, and no increase in complexity. Thus, the achromatic or apochromatic image relay and magnification optical system can be thought of as a wavelength-independent "black box", whose operation on the beam is more or less independent of the wavelength of light introduced to it. Integration of doublets retains good chromatic performance of the optical system up to the fast cylindrical lens.

Optical system 108 is composed of optical devices which have been substantially optimized for one particular wavelength of laser light (e.g., green, red, or blue; in the example discussed herein it is assumed that the optics have been substantially designed and/or optimized for the wavelength or frequency of the green laser in use). Accordingly, the point in space where green image 106 focuses is the desired position for recording green image 106 on a holographic recording material (not shown) positioned in the holographic recording plane (not shown), which is in general a plane perpendicular to the direction of transmission of green image 106 and passing through green focal line 110. Despite the advantages illustrated in FIG. 1, it is readily apparent that additional improvement is need so that all three images 102, 104, and 106 are focused in the same plane, that is, where green focal line 110, blue focal line 112, and red focal line 114 converge.

Figure 2:
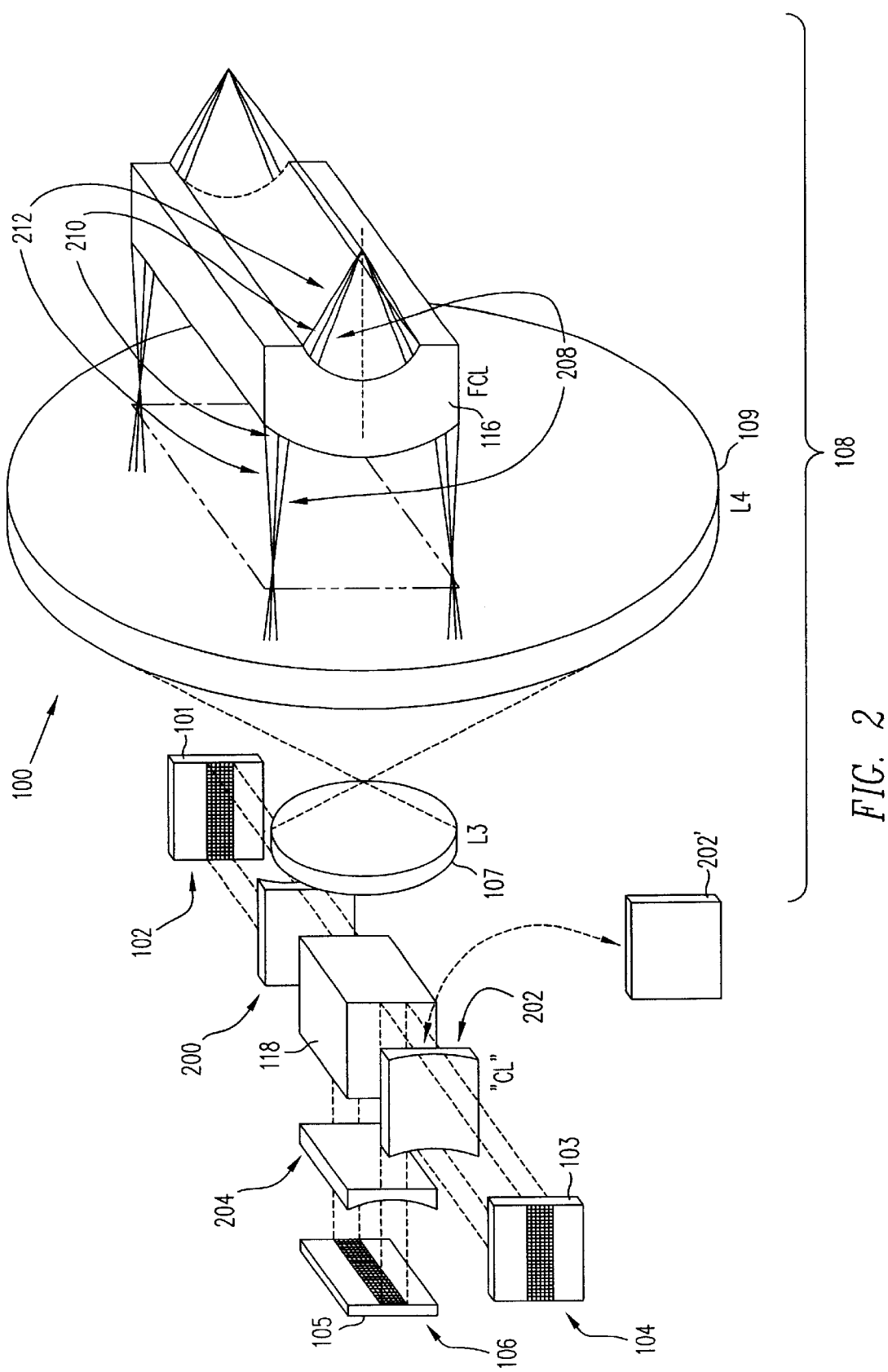
FIG. 2 illustrates the use of chromatic aberration correction optics in the system of FIG. 1.

The present invention takes advantage of the fact that each of the three beams directed onto its respective color-separation SLM can be independently adjusted, thereby compensating for the chromatic aberration of the aggregate system. These corrector optics are designed in accordance with teachings of the present invention to compensate the focus of the FCL for each of the three wavelengths, enabling the FCL to produce co-planar chromatic component foci. FIG. 2 illustrates how the foci of the three images 102, 104, and 106 can be made to converge at the same focal line. Correcting lenses 200, 202, and 204 are shown introduced upstream from the fast cylindrical lens 116 and respectively between SLMs 101, 103, and 105, and color combiner 118. Note that although three lenses are shown, in most implementations only two correcting lenses are used in that optical system 108 is generally optimized for one of the laser wavelengths (e.g., green laser light in the example under discussion). The required optics 200, 202, and 204 may be as simple as cylindrical singlets, available as stock items from existing vendors. This does not preclude the use of other types of corrector optics, including diffractive optics (e.g., a holographic optical element 202'), phase plates, or reflective optics.

Although chromatic corrector optics can adjust for axial focus mismatch, they cannot generally compensate for angular mismatch of the three wavelength beams. This mismatch is illustrated in FIG. 2 by the fact that the red, blue, and green light beams 208, 210, and 212 emerge from FCL 116 travelling non-collinear paths. Correction of this problem is accomplished by scaling images 102, 104, and 106 in the power direction in order to allow passage of a wider or narrower cone of light, depending on what is required. Thus, if a blue separation convergence angle is smaller than the red, the blue mask image 104 can be scaled in order to achieve the same convergence angle as red image 102 at the hologram plane. Such image scaling, and its effects, are illustrated in FIG. 3.

Figure 3:
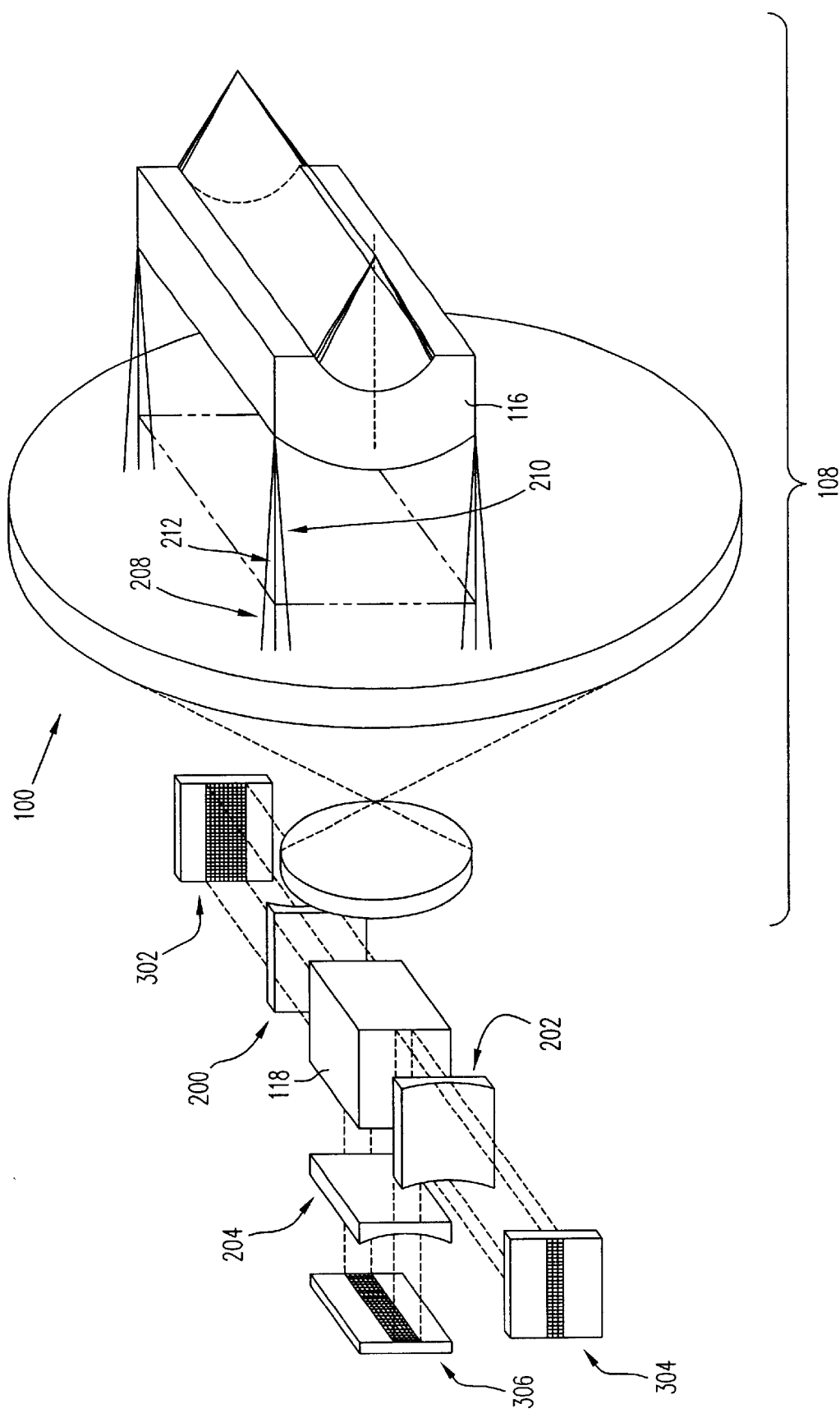
FIG. 3 illustrates how scaling is used to correct for magnification mismatch.

FIG. 3 shows that modified images red image 302, blue image 304, and green image 306 are scaled versions of red image 102, blue image 104, and green image 106, respectively. The amount of scaling needed depends on the wavelengths, the particular corrector optics' prescriptions, and the speed of the FCL. In one implementation, scaling factors necessary to achieve red image 302, blue image 304, and green image 306 are determined empirically via the process described as follows.

As has been noted, in one embodiment optical system 108 has been designed specifically for one particular wavelength of laser light (e.g., green laser light in the current example). Consequently, in one implementation, green image 306 is used as the baseline image and hence is scaled at 100% (i.e., has no change). Furthermore, insofar as the optical system 108 has been designed specifically for green laser light, in such an embodiment correcting lens 204 associated with green image 306 is generally not present or needed since optical system 108 has been designed for green laser light. Correcting lenses 200 and 202 have been chosen such that unscaled red image 102 and blue image 104 respectively focus as sharply as practicable on the holographic recording material in the holographic recording plane. Since the unscaled images interfere with each other, this step is engaged in separately for each color; that is, red image 102 is analyzed until a correcting lens 200 is found sufficient to produce a sharp (albeit mis-sized) projection of red image 102 on recording material placed in the holographic recording plane. Thereafter, the same process is repeated for blue image 104 to obtain an appropriate correcting lens 202.

Once correcting lenses 200 and 202 have been chosen, scaling factors appropriate to red image 102 and blue image 104 can be determined. Again, since optical system 108 has been optimized for green laser light, the projection of green image 306 onto holographic material in the holographic recording plane will be used as the baseline against which the scaling factors for the red and blue laser light projection systems will be adjusted. Note that since it is assumed that the optical system is substantially optimized for green laser light, green image 306 will typically be substantially the same size as green image 106 (no scaling).

In order to determine a scaling factor, in one embodiment, green image 306 is projected onto holographic recording material placed within the holographic recording plane. Thereafter, the size of the projection of green image 306 captured on the holographic recording material in the holographic recording plane is noted, typically by the use of gridlines marked out on the holographic recording material.

Once the projection of green image 306 has been sized, the size of the projection can be used to determine appropriate scaling factors for unscaled red image 102 and unscaled blue image 104 to respectively produce scaled red image 302 and scaled blue image 304 such that when scaled red image 302 and scaled blue image 304 are projected onto holographic recording material in the holographic recording plane, the images captured in the holographic recording material have substantially the same sizing as the image captured for green image 306.

Alternately, the proper scaling is determined by calculation and verified by trial and error, until a far field pattern exhibiting no chromatic fringing is observed. For example, the scaling factors are determined via a trial-and-error approach wherein unscaled red image 102 is scaled via image scaling computational processing software in order to produce scaled red image 302. Thereafter, scaled red image 302 is projected onto holographic recording material placed in the holographic recording plane. Subsequent to capture, the recorded projection of scaled red image 302 is compared to the baseline projection of green image 306. Thereafter, the scaling factor applied to unscaled red image 102 to obtain scaled red image 302 is adjusted such that the size of the projection of scaled red image 302 captured on holographic material positioned within the holographic recording plane will move toward the size of the projection of green image 306 captured on holographic material positioned within the holographic recording plane. The trial-and-error approach is reiterated until the scaling factor is obtained such that scaled red image 302 is of sufficient size that its projection into the holographic recording plane has a size substantially the same as the holographic recording plane projection of green image 306. Once this scaling factor has been so obtained, it is saved for later application to other red images. A similar process is used to scale blue image 104.

Figure 4A:
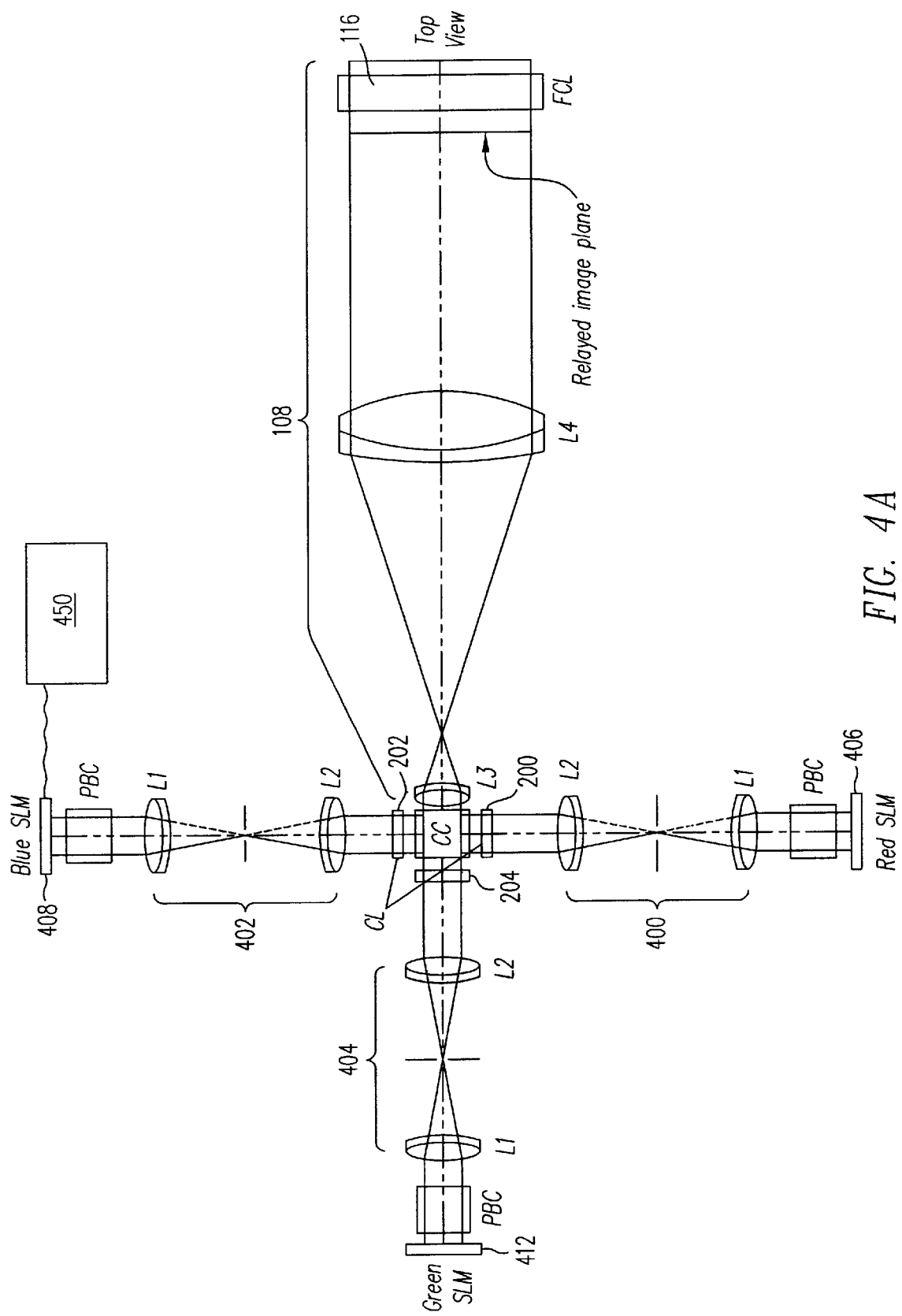
FIGS. 4A–4B show two views of portions of holographic production systems according to one embodiment of the present invention.
Figure 4B:
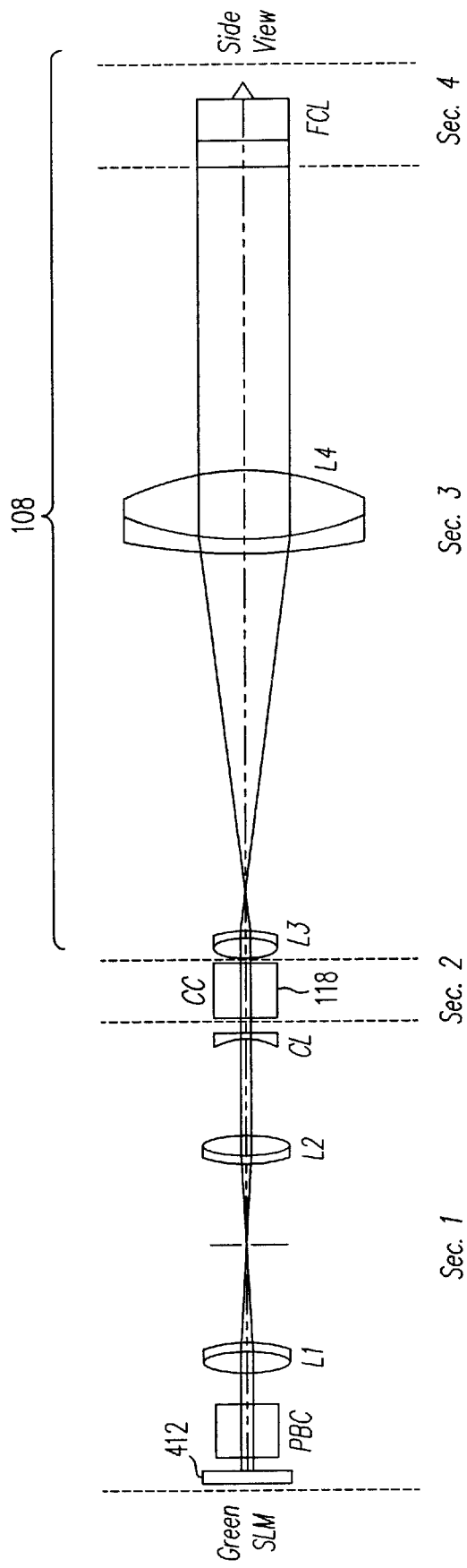

Referring now to FIGS. 4A and 4B respectively, depicted are a top plan view and a side plan view of the partially-schematic diagram of portion 100 of 3-color-combining system illustrated in FIG. 3 embedded in a system wherein magnified versions of red image 102, blue image 104, and green image 106 are transmitted into correcting lenses 200, 202, and 204. Depicted is that magnification apparatuses (e.g., lens pairs) 400, 402, and 404 are substantial duplicates of each other and are each composed of lenses L1, L2 and a PBC. Shown is that magnification apparatuses 400, 402, 404 each respectively constitute a part of their respective projection systems for red, blue, and green SLMs 406, 408, and 412, which are illuminated via red, blue, and green lasers (not shown). Computer system 450 is coupled to SLM 408 and provides image data to SLM 408 as described above. In one embodiment, continuing with the example under discussion, the optics of each magnification apparatus 400, 402, and 404 are assumed to be optimized for green laser light. Accordingly, also shown is that in one embodiment magnification apparatuses 400, 402, and 404 can also be considered as part of optical system 108, since magnification apparatuses 400, 402, and 404 are optics substantially optimized for green light. Thus, in the embodiment shown in FIG. 4, correcting lenses 200, 202, and 204 can be selected to also correct for chromatic distortion introduced by magnification apparatuses 400, 402, and 404.

Those having ordinary skill in the art will appreciate that although the foregoing discussion described correcting chromatic aberrations with correcting lenses and thereafter correcting magnification image problems with computational image processing (i.e., scaling), the chromatic aberrations can corrected via computational image processing as well. Additionally, magnification problems can be corrected by lenses rather than by computational image processing.

Although the disclosed embodiments have been described in detail, it should be understood that various changes, substitutions and alterations can be made to the embodiments without departing from their spirit and scope.

What is claimed is:

1. A system for relaying and conditioning color images for use in producing a holographic stereogram comprising:
   at least two spatial light modulators;
   a color combining element for receiving a respective color image from each spatial light modulator;
   respective chromatic corrector optics operable to adjust the focus mismatch between the color images and disposed between each spatial light modulator and the color combining element; and
   a first cylindrical lens to receive the color images from the at least two spatial light modulators and to project the color images for use in producing the holographic stereogram.

2. The system of claim 1 further comprising:
   a first spherical lens and a second spherical lens, each located between the color combining element and the first cylindrical lens, operable to receive the color images from the color combining element.

3. The system of claim 2 wherein at least one of the first spherical lens and the second spherical lens is an achromatic lens.

4. The system of claim 1 wherein the chromatic corrector optics further comprises at least one of a holographic optical element and a second cylindrical lens.

5. The system of claim 1 wherein the first cylindrical lens is operable to focus each color image projected at a common focal point, and wherein each color image has a different cone angle.

6. The system of claim 1 wherein at least one of the spatial light modulators is operable to scale its respective color image to produce an approximately equal cone angle for each color image projected from the first cylindrical lens.

7. The system of claim 6 wherein the at least one of the spatial light modulators is operable to scale its respective color image in a first direction.

8. The system of claim 1 wherein at least one of the spatial light modulators is a liquid crystal display.

9. The system of claim 1 wherein at least one of the spatial light modulators has a resolution of at least 1280 by 1024 pixels.

10. The system of claim 1 wherein at least one of the spatial light modulators is operable to produce its respective color image with an aspect ratio approximating an aspect ratio of the first cylindrical lens.

11. The system of claim 1 wherein the first cylindrical lens is a fast cylindrical lens.

12. The system of claim 1 wherein the first cylindrical lens is designed for a selected wavelength, and wherein the color images are prepared such that the first cylindrical lens projects the color images with co-planar foci.

13. The system of claim 1 further comprising:
   a first laser operable to provide a coherent light beam to a first one of the at least two spatial modulators;
   a second laser operable to provide a coherent light beam to a second one of the at least two spatial modulators; and
   a computer system coupled to and operable to provide image data to at least one of the first one of the at least two spatial modulators and the second one of the at least two spatial modulators.

* * * * *